United States Patent
Hikichi (10) Patent No.: US 10,173,350 B2
(45) Date of Patent: Jan. 8, 2019

(54) MODELING APPARATUS

(71) Applicant: FUJI XEROX CO., LTD., Tokyo (JP)

(72) Inventor: Takehito Hikichi, Ebina (JP)

(73) Assignee: FUJI XEROX CO., LTD., Tokyo (JP)

( * ) Notice: Subject to any disclaimer, the term of this patent is extended or adjusted under 35 U.S.C. 154(b) by 261 days.

(21) Appl. No.: 15/206,411

(22) Filed: Jul. 11, 2016

(65) Prior Publication Data

US 2017/0210076 A1    Jul. 27, 2017

(30) Foreign Application Priority Data

Jan. 25, 2016  (JP) ................ 2016-011701

(51) Int. Cl.
B29C 67/00 (2017.01)
B29C 35/08 (2006.01)
(Continued)

(52) U.S. Cl.
CPC ........ B29C 35/0805 (2013.01); B29C 64/112 (2017.08); B29C 64/20 (2017.08);
(Continued)

(58) Field of Classification Search
CPC ..... B29C 64/112; B29C 64/386; B29C 64/20; B29C 67/0051; B29C 67/0055;
(Continued)

(56) References Cited

U.S. PATENT DOCUMENTS

2005/0104241 A1* 5/2005 Kritchman ............. B33Y 30/00
                                                   264/40.1
2007/0075460 A1   4/2007 Wahlstrom et al.
(Continued)

FOREIGN PATENT DOCUMENTS

CN          1974185 A     6/2007
CN        201693773 U     1/2011
(Continued)

OTHER PUBLICATIONS

Search Report dated Jun. 21, 2017 by the European Patent Office in counterpart European Patent Application No. 16182307.5.
(Continued)

*Primary Examiner* — Joseph S Del Sole
*Assistant Examiner* — Lawrence D. Hohenbrink, Jr.
(74) *Attorney, Agent, or Firm* — Sughrue Mion, PLLC (57) ABSTRACT

A modeling apparatus includes: a moving unit that moves reciprocally and relatively with respect to a board; one or a plurality of ejecting units that are disposed at the moving unit, and that ejects a droplet of a photo-curable modeling liquid toward the board; a light-emitting device having a first light-emitting unit that is disposed at the moving unit and that emits emission light to the modeling liquid which is ejected and landed on the board, while the ejecting unit is moved in a forward direction, to cure the modeling liquid, and a second light-emitting unit that is disposed at the moving unit and that emits emission light to the modeling liquid which is ejected and landed on the board, while the ejecting unit is moved in a backward direction, to cure the modeling liquid; a control section as defined herein; and a flattening unit as defined herein.

9 Claims, 6 Drawing Sheets

(51) Int. Cl.
    *B33Y 30/00*     (2015.01)
    *B29C 64/112*     (2017.01)
    *B29C 64/20*     (2017.01)
    *B29C 64/386*     (2017.01)
    *B29K 105/00*     (2006.01)

(52) U.S. Cl.
    CPC ............ B29C 64/386 (2017.08); B33Y 30/00 (2014.12); *B29C 2035/0827* (2013.01); *B29K 2105/0058* (2013.01)

(58) Field of Classification Search
    CPC ............ B29C 67/0059; B29C 67/0062; B29C 67/0066; B29C 67/0085; B33Y 30/00
    USPC ................................. 425/375, 174.4; 264/308
    See application file for complete search history.

(56) References Cited

U.S. PATENT DOCUMENTS

| | | |
|---|---|---|
| 2007/0075461 A1 | 4/2007 | Hunter et al. |
| 2014/0036455 A1* | 2/2014 | Napadensky ....... B29C 67/0059 361/748 |
| 2016/0059482 A1* | 3/2016 | Hakkaku ................ B33Y 30/00 264/401 |
| 2017/0225390 A1 | 8/2017 | Napadensky |

FOREIGN PATENT DOCUMENTS

| | | |
|---|---|---|
| CN | 103747943 A | 4/2014 |
| EP | 1674243 A2 | 6/2006 |
| JP | 2012-106392 A | 6/2012 |
| JP | 2013-67121 A | 4/2013 |
| JP | 2015-150840 A | 8/2015 |
| WO | 2012/143923 A2 | 10/2012 |
| WO | 2013/026972 A1 | 2/2013 |
| WO | 2015/108849 A1 | 7/2015 |

OTHER PUBLICATIONS

Communication dated Jul. 30, 2018, from the State Intellectual Property Office of People's Republic of China in counterpart Application No. 201610670331.5.

* cited by examiner

MODELING APPARATUS

CROSS-REFERENCE TO RELATED APPLICATIONS

This application is based on and claims priority under 35 USC 119 from Japanese Patent Application No. 2016-011701 filed on Jan. 25, 2016.

TECHNICAL FIELD

The present invention relates to a modeling apparatus.

SUMMARY

According to an aspect of the invention, there is provided a modeling apparatus comprising: a moving unit that moves reciprocally and relatively with respect to a board; one or a plurality of ejecting units that are disposed at the moving unit, and that ejects a droplet of a photo-curable modeling liquid toward the board; a light-emitting device having a first light-emitting unit that is disposed at the moving unit and that emits emission light to the modeling liquid which is ejected and landed on the board, while the ejecting unit is moved in a forward direction, to cure the modeling liquid, and a second light-emitting unit that is disposed at the moving unit and that emits emission light to the modeling liquid which is ejected and landed on the board, while the ejecting unit is moved in a backward direction, to cure the modeling liquid; a control section that controls the moving unit, the ejecting unit, and the light-emitting device, and that models a three-dimensional object on the board by repeatedly ejecting the droplet and emitting the emission lights so as to cure the droplet while causing the moving unit to move reciprocally and relatively with respect to the board; and a flattening unit that is disposed at one location in the moving unit, and that comes into contact with and flattens the landed modeling liquid.

DETAILED DESCRIPTION

Hereinafter, with regard to a form for embodying the invention (hereinafter, referred to as an exemplary embodiment), two exemplary embodiments (first and second exemplary embodiments in the following) will be separately described. Description will be made by setting a direction ±Z in the drawing to be an apparatus height direction (a direction Z represents an upper side, and a direction −Z represents a lower side), a direction ±X to be an apparatus width direction (a direction X represents one end side, and a direction −X represents the other end side), and a direction intersecting the direction ±Z and the direction ±X (a direction ±Y) to be an apparatus depth direction (a direction Y represents a back side, and a direction −Y represents a front side).

[First Exemplary Embodiment]

First, a modeling apparatus 10 according to a first exemplary embodiment will be described with reference to the drawings.

<Overall Configuration>

Figure 1:
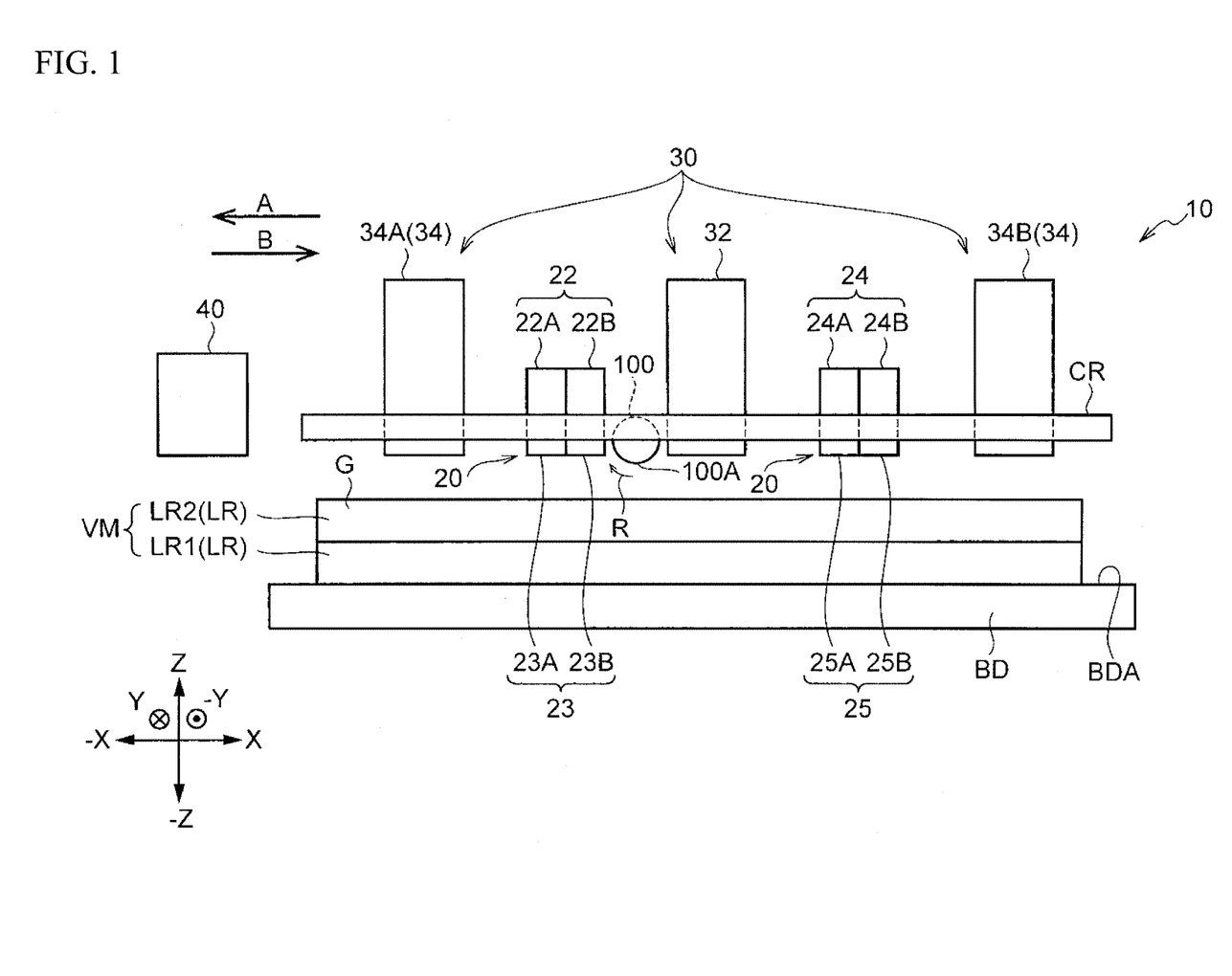
FIG. 1 is a schematic view (front view) illustrating a state where a modeling apparatus according to a first exemplary embodiment forms a three-dimensional object.
Figure 2:
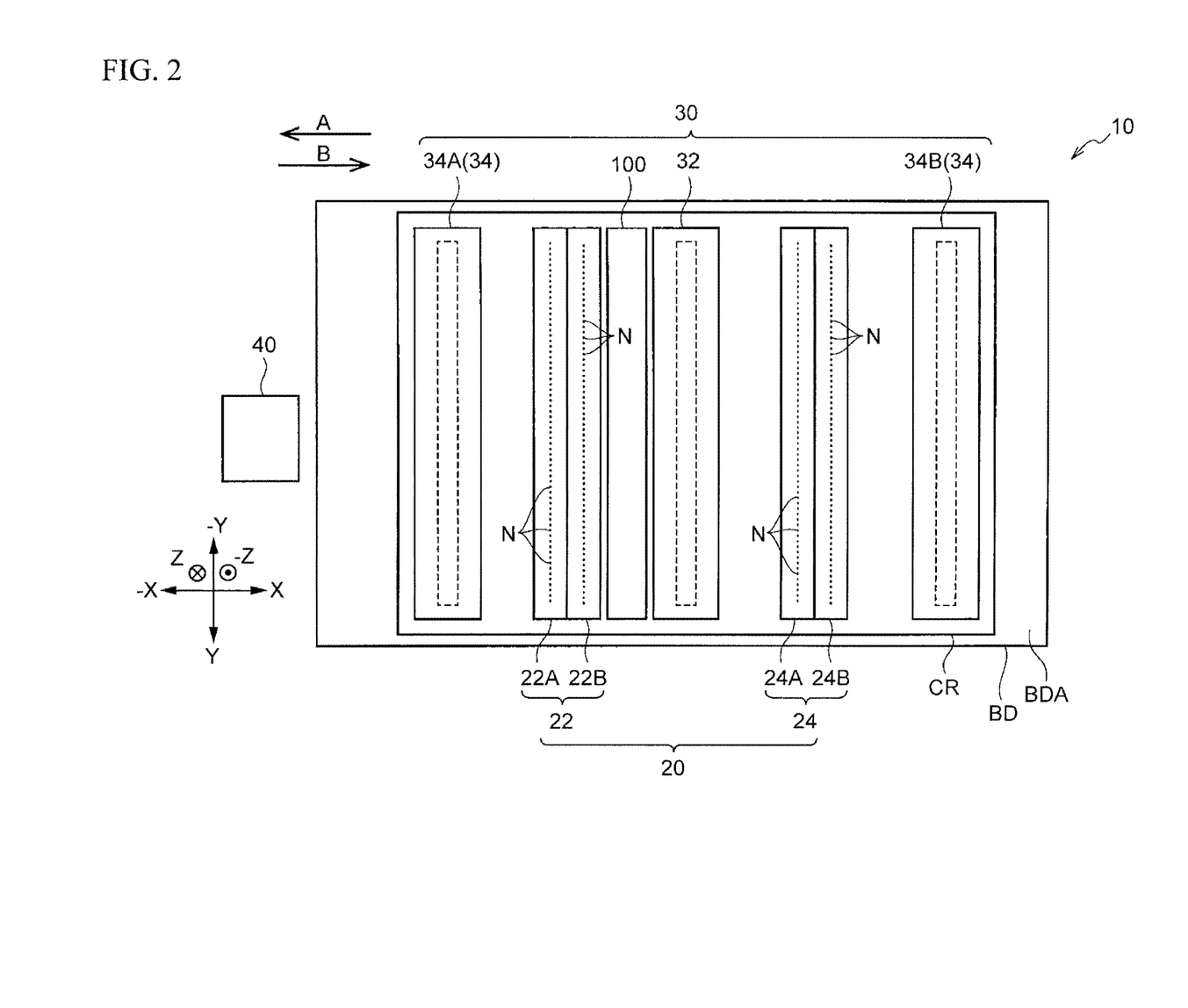
FIG. 2 is a schematic view (top view) of the modeling apparatus according to the first exemplary embodiment.

As illustrated in FIGS. 1 and 2, the modeling apparatus 10 according to the present exemplary embodiment is configured to include a board BD, a carriage CR, an ejecting unit 20, a light-emitting device 30, a flattening roller 100, and a control section 40.

The modeling apparatus 10 according to the present exemplary embodiment overlaps layers LR (refer to FIG. 1) cured by ejecting a first droplet D1 toward a board BD from a first ejecting unit 22 configuring an ejecting unit 20, by ejecting a second droplet D2 from a second ejecting unit 24, and by causing a light-emitting device 30 to emit emission light to the first droplet D1 and the second droplet D2 which are landed on the board BD, thereby modeling a three-dimensional object VM (refer to FIG. 1).

In the description below, the first droplet D1 and the second droplet D2 will be referred to as a droplet D, in a case where no distinction is particularly required.

Board

As illustrated in FIGS. 1 and 2, the board BD is a plate-shaped member having an upper surface BDA formed along the apparatus width direction and the apparatus depth direction. Then, the three-dimensional object VM (refer to FIG. 1) is modeled on the upper surface BDA of the board BD.

Carriage

A carriage CR serving as an example of a moving unit is configured to be capable of reciprocating within a predetermined range in the apparatus width direction while being caused to move along a guide rail (not illustrated) by a drive device (not illustrated). In the present exemplary embodiment, the movement in a direction A in FIGS. 1 and 2 represents a forward route and a forward direction. The movement in a direction B represents a backward route and a backward direction.

The carriage CR is a rectangular frame, and is disposed above the upper surface BDA of the board BD. In addition, the carriage CR has the first ejecting unit 22 and the second ejecting unit 24 which configure the ejecting unit 20, and a first light-emitting unit 32 and second light-emitting units 34A and 34B which configure the light-emitting device 30 (to be described later), at predetermined intervals from one end side (outer side in a direction of an arrow B) to the other end side (outer side in a direction of an arrow A) in the apparatus width direction (reciprocating direction).

In addition, the flattening roller 100 is disposed between the first ejecting unit 22 and the first light-emitting unit 32.

Accordingly, if the carriage CR moves reciprocally and relatively with respect to the board BD, the ejecting unit 20, the light-emitting device 30, and the flattening roller 100 move reciprocally and relatively with respect to the board BD.

In addition, during a period while the modeling apparatus 10 does not perform a modeling operation, that is, during a period after the modeling operation is completed and before the modeling operation starts, the carriage CR is disposed at a home position by a drive source of the carriage CR controlled by the control section 40.

Here, the home position represents a position which is an end of one end side in the apparatus width direction and an end on the lower side in the apparatus height direction, in the modeling apparatus 10. In a state where the carriage CR is disposed at the home position, the ejecting unit 20, the light-emitting device 30, and the flattening roller 100 which are disposed at the carriage CR are separated from the upper surface BDA of the board BD.

Ejecting Unit

As illustrated in FIGS. 1 and 2, the ejecting unit 20 has the first ejecting unit 22 and the second ejecting unit 24. While the ejecting unit 20 controlled by the control section 40 moves relative to the board BD together with the carriage CR, the ejecting unit 20 ejects the first droplet D1 toward the board BD from an ejecting surface 23 (refer to FIG. 1) of the first ejecting unit 22, and ejects the second droplet D2 from an ejecting surface 25 (refer to FIG. 1) of the second ejecting unit 24.

First Ejecting Unit

The first ejecting unit 22 includes a first head 22A and a second head 22B. The first head 22A ejects the first droplet D1 configured to include a modeling material. In addition, the second head 22B ejects the first droplet D1 configured to include a support material.

In addition, the modeling material and the support material according to the present exemplary embodiment are configured to include a photo-curable resin (ultraviolet-curable resin as an example in the present exemplary embodiment).

If a predetermined light amount (or illumination corresponding to the light amount) of emission light is emitted, a modeling liquid G (droplet D) serving as the modeling material and the support material according to the present exemplary embodiment is cured to such an extent that the modeling liquid G cannot move from a landed position even if the modeling liquid G comes into contact with the modeling liquid G (droplet D) to which the emission light is not emitted. Then, if the total amount of light corresponding to the predetermined light amount is emitted, the modeling liquid G (droplet D) serving as the modeling material and the support material according to the present exemplary embodiment is cured to such an extent that the modeling liquid G configures the layer LR.

Here, the modeling material means a material which configures a modeling object M modeled using the modeling apparatus 10. In addition, the support material means a material which does not configure the modeling object M although the support material configures the three-dimensional object VM together with the modeling material when required in a process of modeling the modeling object M.

According to the present exemplary embodiment, the modeling apparatus 10 forms the three-dimensional object VM, and the three-dimensional object VM is detached from the modeling apparatus 10. Thereafter, the support material is detached from the three-dimensional object VM by a worker, thereby obtaining a desired three-dimensional object VM.

The first head 22A and the second head 22B have the same configuration except for each material of the droplet D ejected by both of these. As illustrated in FIG. 2, the first head 22A and the second head 22B have an elongated shape. Then, the first head 22A and the second head 22B are disposed in the order of the first head 22A and the second head 22B from the other side (outer side in the direction A) in the apparatus width direction.

As illustrated in FIG. 1, the first head 22A and the second head 22B have ejecting surfaces 23A and 23B facing the board BD. Then, as respectively illustrated in FIG. 2, the ejecting surfaces 23A and 23B of the first head 22A and the second head 22B have a plurality of nozzles N arrayed in parallel at equal intervals along the apparatus depth direction.

As described above, the second head 22B and the first head 22A are configured so that respective side surfaces in the short direction are in contact with each other. More specifically, all of the nozzles N belonging to the second head 22B are disposed so as to respectively overlap all of the nozzles N belonging to the first head 22A in the apparatus width direction.

Figure 5:
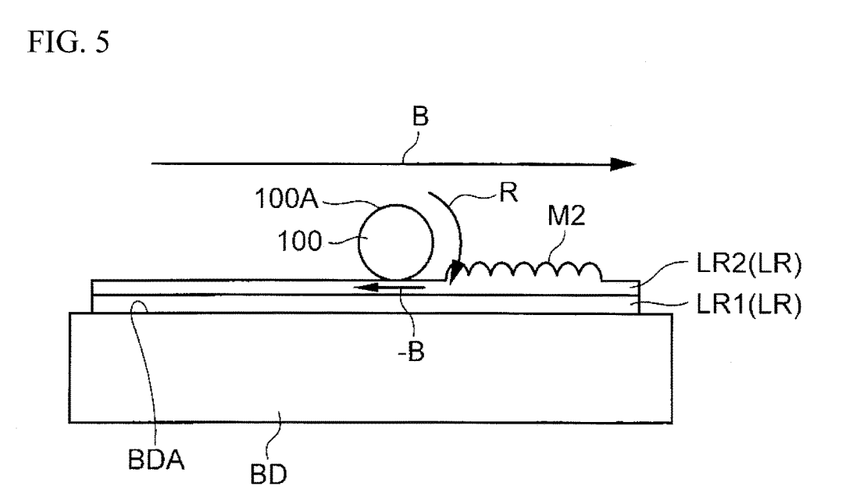
FIG. 5 is a view for describing a flattening operation performed by the flattening roller when moving in a direction B according to the first exemplary embodiment.

According to the above-described configuration, if the first ejecting unit 22 ejects the first droplet D1 toward the board BD while moving in the apparatus width direction together with the carriage CR, the first droplet D1 is landed in a state of being separated in the apparatus depth direction (refer to FIG. 5).

Second Ejecting Unit

The second ejecting unit 24 includes a first head 24A and a second head 24B. Then, similarly to a case of the first ejecting unit 22, the first head 24A and the second head 24B which configure the second ejecting unit 24 are configured to eject the second droplet D2 configured to include the modeling material and the second droplet D2 configured to include the support material.

As illustrated in FIG. 2, the first head 24A and the second head 24B which configure the second ejecting unit 24 are disposed in the order of the first head 24A and the second head 24B from the other side in the apparatus width direction.

Similarly to a case of the first ejecting unit 22, in the first head 24A and the second head 24B which configure the second ejecting unit 24, all of the nozzles N belonging to the ejecting surface 25B of the second head 24B are disposed so as to respectively overlap all of the nozzles N belonging to the ejecting surface 25A of the first head 24A in the apparatus width direction.

The second ejecting unit 24 is disposed while being shifted from the first ejecting unit 22 as far as a half pitch of a nozzle pitch in the apparatus depth direction.

According to the above-described configuration, the second ejecting unit 24 ejects the second droplet D2 to a portion between the first droplets D1 ejected by the first ejecting unit 22, while moving in the apparatus width direction together with the carriage CR.

Light-Emitting Unit

The light-emitting device 30 has a function of emitting the emission light (as an example, ultraviolet) to the landed droplet D (modeling liquid) while moving to the board BD in the apparatus width direction together with the carriage CR, and curing the droplet D (modeling liquid). As illustrated in FIGS. 1 and 2, the light-emitting device 30 includes the first light-emitting unit 32 and the second light-emitting unit 34.

First Light-Emitting Unit

As illustrated in FIG. 2, the first light-emitting unit 32 has an elongated shape. According to the present exemplary embodiment, the first light-emitting unit 32 is disposed between the first ejecting unit 22 and the second ejecting unit 24 in the carriage CR. A region surrounded with a broken line inside the first light-emitting unit 32 represents a light emission region of the emission light in the first light-emitting unit 32.

Second Light-Emitting Unit

As illustrated in FIG. 2, the second light-emitting unit 34 is configured to include a pair of second light-emitting units 34A and 34B. The second light-emitting units 34A and 34B according to the present exemplary embodiment have the same configuration as that of the first light-emitting unit 32. The pair of second light-emitting units 34A and 34B are disposed at the carriage CR while interposing the first ejecting unit 22 and the second ejecting unit 24 therebetween.

A region surrounded with a broken line inside the second light-emitting units 34A and 34B represents a light emission region of the emission light in the second light-emitting units 34A and 34B.

Flattening Roller

As illustrated in FIGS. 1 and 2, the flattening roller 100 serving as an example of the flattening unit is disposed in one location between the first ejecting unit 22 configuring the ejecting unit 20 and the first light-emitting unit 32 configuring the light-emitting device 30 in the carriage CR.

As illustrated in FIG. 1, an outer peripheral surface 100A of the flattening roller 100 is located on a lower side from the ejecting surface 23 of the first ejecting unit 22 and the ejecting surface 25 of the second ejecting unit 24. In addition, as illustrated in FIG. 2, in the flattening roller 100, the direction Y is a longitudinal direction, similarly to the first ejecting unit 22 and the second ejecting unit 24. The flattening roller 100 according to the present exemplary embodiment is configured to include metal such as SUS. However, without being limited thereto, the flattening roller 100 may be configured to include a resin or a rubber material.

Figure 3:
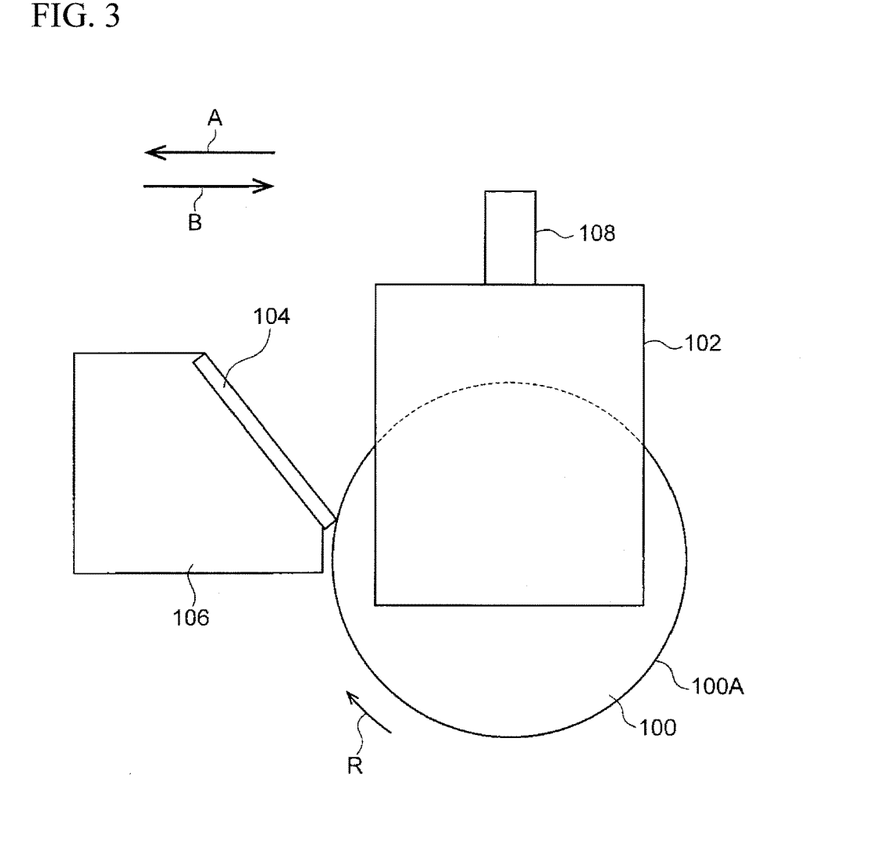
FIG. 3 is a schematic view illustrating a peripheral structure of a flattening roller according to the first exemplary embodiment.

As illustrated in FIG. 3, the flattening roller 100 is disposed at the carriage CR (refer to FIGS. 1 and 2), and is rotated in a direction R by a rotary mechanism 102 controlled by the control section 40 (refer to FIGS. 1 and 2).

In addition, the flattening roller 100 is disposed at the carriage CR (refer to FIGS. 1 and 2), and is moved and fixed to a predetermined height position by a lifting mechanism 108 controlled by the control section 40 (refer to FIGS. 1 and 2).

Furthermore, the flattening roller 100 is disposed at the carriage CR (refer to FIGS. 1 and 2), and has a scraper 104 which removes the modeling liquid G (to be described later) attached to the outer peripheral surface 100A and a collection mechanism 106 which collects the modeling liquid G removed by the scraper 104.

Control Section

As illustrated in FIGS. 1 and 2, the control section 40 has a function of controlling each unit of the modeling apparatus 10. Specifically, in accordance with data received from an external device (not illustrated), the control section 40 converts data of the three-dimensional object VM included in the data into layer data for forming each layer LR in which the three-dimensional object VM is sliced with a determined thickness using a cross section perpendicular to the height direction. In accordance with the layer data, the control section 40 controls each unit configuring the modeling apparatus 10.

<Operation>

Next, modeling the three-dimensional object VM by using the modeling apparatus 10 according to the present exemplary embodiment will be described, and an operation in the present exemplary embodiment will be described. A state after the droplet D ejected from the first ejecting unit 22 and the second ejecting unit 24 is landed on the board BD or the layer LR is referred to as the modeling liquid G.

First, if the control section 40 receives the data from the external device, the control section 40 converts the data of the three-dimensional object VM included in the above-described data into the layer data for forming each layer LR. In addition, the control section 40 controls the lifting mechanism 108 so as to move and fix the flattening roller 100 to a predetermined height position.

Next, the control section 40 causes the first ejecting unit 22 to eject the first droplet D1 while causing a drive source to move the carriage CR disposed at the home position in the direction A (forward direction).

Figure 4:
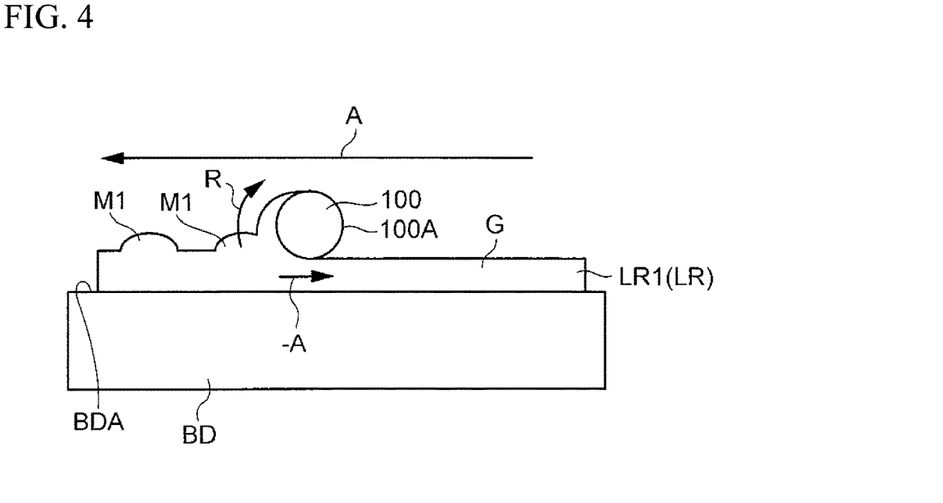
FIG. 4 is a view for describing a flattening operation performed by the flattening roller when moving in a direction A according to the first exemplary embodiment.

As illustrated in FIG. 4, unevenness M1 greatly undulated by irregular droplets appears on a surface of the modeling liquid G in which the droplet D is landed on the board BD. Then, the unevenness M1 greatly undulated on the surface of the modeling liquid G before the light is emitted thereto is flattened by the flattening roller 100 moving in the direction A while being rotated in the direction R. Specifically, the unevenness M1 (accurately, a convex portion of the unevenness M1) is attached to the flattening roller 100, thereby flattening the unevenness M1. The modeling liquid G attached to the flattening roller 100 is scraped and removed by the scraper 104 illustrated in FIG. 3, and is collected by the collection mechanism 106.

The direction R in this case represents a rotation direction opposite to the movement direction (direction −A) in which the modeling liquid G (board BD) moves relative to the flattening roller 100 (carriage CR) at a contact portion with the modeling liquid G of the flattening roller 100. Accordingly, the modeling liquid G is more effectively flattened, compared to a case where the flattening roller 100 is rotated in the same direction as the movement direction in which the modeling liquid G (board BD) moves relative to the flattening roller 100.

Next, as the carriage CR moves in the direction A (forward direction), the control section 40 uses the first light-emitting unit 32 so as to emit the emission light to the first droplet D1. As a result, the emission light is emitted to the first droplet D1, thereby curing the first droplet D1.

Next, as the carriage CR moves in the direction A (forward direction), the control section 40 causes the second ejecting unit 24 to eject the second droplet D2 so as to be landed between the first droplets D1.

Next, as the carriage CR moves in the direction A (forward direction), the control section 40 uses the second light-emitting unit 34B so as to emit the emission light to the second droplet D2. As a result, the emission light is emitted to the second droplet D2, thereby curing the second droplet D2. In addition, the emission light emitted by the second light-emitting unit 34B is also emitted to the first droplet D1, thereby further curing the first droplet D1. The second light-emitting unit 34B in this case corresponds to the light-emitting unit on the upstream side in the movement direction (direction A) of the carriage CR.

If the control section 40 moves the carriage CR to an end on the other end side in the apparatus width direction, a layer LR1 obtained by curing the first droplet D1 and the second droplet D2 is formed on the upper surface BDA of the board BD.

After moving the carriage CR to an end on the other end side in the apparatus width direction, the control section 40 moves the carriage CR to the upper side in the apparatus height direction as far as the thickness of the layer LR. In addition, the control section 40 controls the lifting mechanism 108 so as to move and fix the flattening roller 100 to a predetermined height position.

Then, a layer LR2 serving as the second layer is formed by performing the operation for forming the layer LR1 serving as the above-described first layer while the movement direction of the carriage CR is reversed and the carriage CR is moved in the direction B (backward direction).

While moving the carriage CR in the direction B (backward direction), the control section 40 causes the second ejecting unit 24 to eject the second droplet D2.

Next, as the carriage CR moves in the direction B (backward direction), the control section 40 uses the first light-emitting unit 32 so as to emit the emission light to the first droplet D1. As a result, the emission light is emitted to the first droplet D1, thereby curing the first droplet D1.

As illustrated in FIG. 5, the light is emitted once to the cured modeling liquid G. Accordingly, the modeling liquid G is not completely cured, and is in a semi-cured state. Then, minute unevenness M2 which is minor compared to the unevenness M1 (refer to FIG. 4) before the light is emitted (before the modeling liquid G is cured) appears on the surface of the semi-cured modeling liquid G. Then, the minute unevenness M2 on the surface of the modeling liquid G in a semi-cured state after the light is emitted is flattened by the flattening roller 100 which moves in the direction B (backward direction) while being rotated in the direction R. Specifically, the flattening roller 100 is pressed against the unevenness M2 so as to uniformly flatten the minute unevenness M2.

The direction R in this case represents the rotation direction which is the same as the movement direction (direction −B) in which the modeling liquid G (board BD) moves relative to the flattening roller 100 (carriage CR), at a contact portion between the flattening roller 100 and the modeling liquid G. Accordingly, the modeling liquid G is more effectively flattened, compared to a case where the flattening roller 100 is rotated in the direction opposite to the movement direction in which the modeling liquid G (board BD) moves relative to the flattening roller 100.

Next, as the carriage CR moves in the direction B (backward direction), the control section 40 causes the first ejecting unit 22 to eject the first droplet D1 so as to be landed between the second droplets D2.

Next, as the carriage CR moves in the direction B (backward direction), the control section 40 uses the second light-emitting unit 34A so as to emit the emission light to the first droplet D1. As a result, the emission light is emitted to the first droplet D1, thereby curing the first droplet D1. In addition, the emission light emitted by the second light-emitting unit 34A is also emitted to the second droplet D2. The second light-emitting unit 34A in this case corresponds to the light-emitting unit on the upstream side in the movement direction (direction B) of the carriage CR.

Then, as illustrated in FIG. 1, if the control section 40 moves the carriage CR to an end on one end side in the apparatus width direction, the layer LR2 obtained by curing the first droplet D1 and the second droplet D2 is formed on the board BD.

After moving the carriage CR to an end on one end side in the apparatus width direction, the control section 40 moves the carriage CR to the upper side in the apparatus height direction as far as the thickness of the layer LR. In addition, the control section 40 controls the lifting mechanism 108 so as to move and fix the flattening roller 100 to a predetermined height position.

The layer LR including and subsequent to the third layer is formed by repeatedly performing the operation for forming the layer LR1 serving as the above-described first layer and the layer LR2 serving as the second layer while the movement direction of the carriage CR is reversed.

Then, if all of the layers LR are overlapped, the control section 40 moves the carriage CR to the home position, thereby completing the operation for forming the three-dimensional object VM by using the modeling apparatus 10 according to the present exemplary embodiment.

After the modeling operation of the three-dimensional object VM is completed by using the modeling apparatus 10, the three-dimensional object VM is detached from the modeling apparatus 10. Thereafter, the cured support material is detached from the three-dimensional object VM by a worker, thereby completely forming the modeling object M.

When the carriage CR moves in the direction A (forward direction) in this way, the flattening roller 100 flattens the modeling liquid G before the light is emitted. When the carriage CR moves in the direction B (backward direction), the flattening roller 100 flattens the modeling liquid G after the light is emitted.

Here, a comparative example will be described in which the carriage CR has a plurality of flattening rollers 100. For example, in a case where there are provided two flattening rollers 100 such as the flattening roller 100 for the flattening operation when the carriage CR moves in the forward direction and the flattening roller 100 for the flattening operation when the carriage CR moves in the backward direction, it is necessary to control a height position of the two flattening rollers 100 very accurately (for example, within 10% of the layer LR of the modeling liquid). However, it is very difficult to control the height position of these two flattening rollers 100 very accurately. As a result, if the two flattening rollers 100 are provided, there is a possibility that accuracy in performing the flattening operation may be degraded.

However, in the modeling apparatus 10 according to the present exemplary embodiment, only one flattening roller 100 is disposed at the carriage CR. Accordingly, it is not necessary to align the respective heights of the plurality of flattening rollers 100. Therefore, the accuracy is further improved in flattening the modeling liquid G, compared to a case where the plurality of flattening rollers 100 are disposed at the carriage CR.

[Second Exemplary Embodiment]

Next, a modeling apparatus 210 according to a second exemplary embodiment will be described with reference to the drawings. The same reference numerals will be given to members the same as those according to the first exemplary embodiment, and repeated description thereof will be omitted.

<Configuration>

Figure 6:
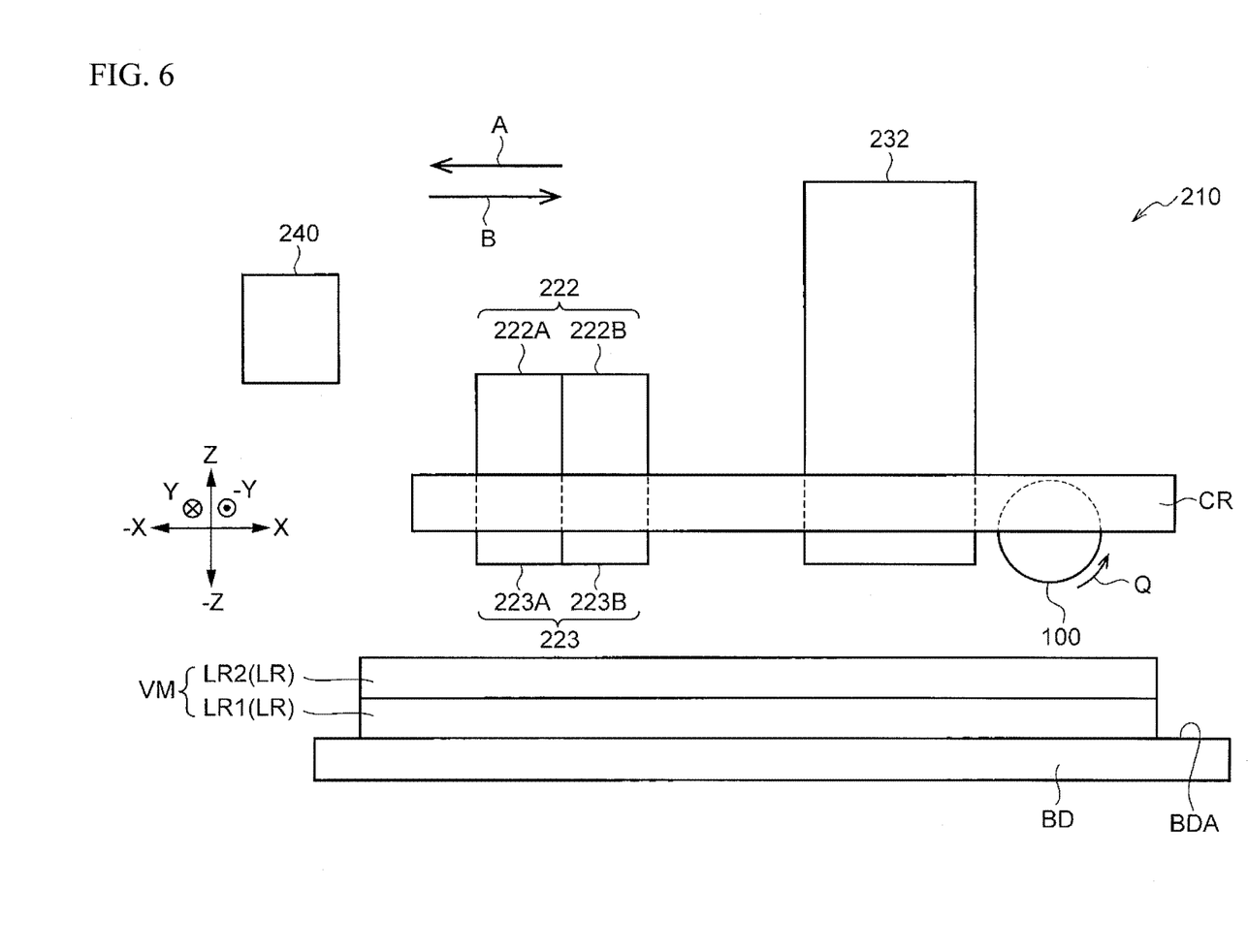
FIG. 6 is a schematic view (front view) illustrating a state where a modeling apparatus according to a second exemplary embodiment forms a three-dimensional object.

As illustrated in FIG. 6, the modeling apparatus 210 according to the present exemplary embodiment is configured to include the board BD, the carriage CR, an ejecting unit 222, a light-emitting unit 232, the flattening roller 100, and a control section 240.

The modeling apparatus 210 according to the present exemplary embodiment overlaps layers LR cured by ejecting the droplet D toward the board BD from the ejecting unit 222 and by causing the light-emitting device 30 to emit the emission light to the landed droplet D, thereby modeling the three-dimensional object VM.

Board

The board BD is a plate-shaped member having the upper surface BDA formed along the apparatus width direction and the apparatus depth direction. Then, the three-dimensional object VM is modeled on the upper surface BDA of the board BD.

Carriage

A carriage CR serving as an example of a moving unit is configured to be capable of reciprocating within a predetermined range in the apparatus width direction while being caused to move along a guide rail (not illustrated) by a drive device (not illustrated). The movement in the direction A in FIG. 6 represents the forward route and the forward direction. The movement in the direction B represents the backward route and the backward direction.

The carriage CR is a rectangular frame, and is disposed above the upper surface BDA of the board BD. In addition, the carriage CR has the ejecting unit 222 and the light-emitting unit 232, at predetermined intervals from one end side (outer side in the direction of the arrow B) to the other end side (outer side in the direction of the arrow A) in the apparatus width direction (reciprocating direction).

In addition, the flattening roller 100 is disposed on the outer side in the direction B of the light-emitting unit 232.

Accordingly, a configuration is adopted in which if the carriage CR moves reciprocally and relatively with respect to the board BD, the ejecting unit 222, the light-emitting unit 232, and the flattening roller 100 move reciprocally and relatively with respect to the board BD.

In addition, during a period while the modeling apparatus 210 does not perform the modeling operation, that is, during a period after the modeling operation is completed and before the modeling operation starts, the carriage CR is disposed at the home position by a driving device of the carriage CR controlled by the control section 240.

Here, the home position represents a position which is an end of one end side in the apparatus width direction and an end on the lower side in the apparatus height direction, in the modeling apparatus 210. In a state where the carriage CR is disposed at the home position, the ejecting unit 222, the light-emitting unit 232, and the flattening roller 100 which are disposed at the carriage CR are separated from the upper surface BDA of the board BD.

Ejecting Unit

The ejecting unit 222 is controlled by the control section 240, and ejects the droplet D toward the board BD from an ejecting surface 223 of the ejecting unit 222, while moving relative to the board BD together with the carriage CR. The ejecting unit 222 includes a first head 222A and a second head 222B. The first head 222A ejects the droplet D configured to include the modeling material. In addition, the second head 222B ejects the droplet D configured to include the support material.

The modeling material and the support material according to the present exemplary embodiment are configured to include a photo-curable resin (ultraviolet-curable resin as an example in the present exemplary embodiment).

If a predetermined light amount (or illumination corresponding to the light amount) of emission light is emitted, a modeling liquid G (droplet D) serving as the modeling material and the support material according to the present exemplary embodiment is cured to such an extent that the modeling liquid G cannot move from a landed position even if the modeling liquid G comes into contact with the modeling liquid G (droplet D) to which the emission light is not emitted. Then, if the total amount of light corresponding to the predetermined light amount is emitted, the modeling liquid G (droplet D) serving as the modeling material and the support material according to the present exemplary embodiment is cured to such an extent that the modeling liquid G configures the layer LR.

Here, the modeling material means a material which configures the modeling object M modeled using the modeling apparatus 210. In addition, the support material means a material which does not configure the modeling object M although the support material configures the three-dimensional object VM together with the modeling material when required in a process of modeling the modeling object M.

According to the present exemplary embodiment, the modeling apparatus 210 forms the three-dimensional object VM, and the three-dimensional object VM is detached from the modeling apparatus 210. Thereafter, the support material is detached from the three-dimensional object VM by a worker, thereby obtaining a desired three-dimensional object VM.

The first head 222A and the second head 222B have the same configuration as that of the first head 22A and the second head 22B according to the first exemplary embodiment, except for a nozzle pitch of the nozzle N (refer to FIG. 2), and thus, detailed description thereof will be omitted.

Light-Emitting Unit

The light-emitting unit 232 has a function of emitting the emission light (as an example, ultraviolet) to the landed droplet D (modeling liquid G) while moving to the board BD in the apparatus width direction together with the carriage CR, and curing the droplet D (modeling liquid G). The light-emitting unit 232 has the same configuration as that of the first light-emitting unit 32 according to the first exemplary embodiment, and thus, detailed description thereof will be omitted.

Flattening Roller

One flattening roller 100 serving as an example of the flattening unit is disposed in one location on the outer side in the direction B of the light-emitting unit 232 in the carriage CR. The flattening roller 100 has the same configuration as that of the flattening roller 100 according to the first exemplary embodiment.

Figure 7:
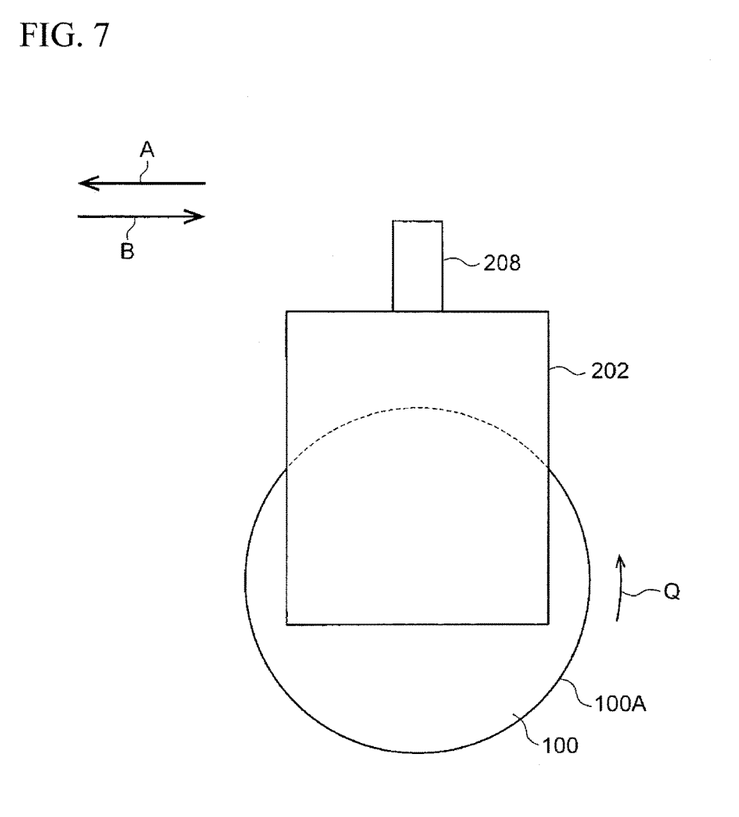
FIG. 7 is a schematic view illustrating a peripheral structure of a flattening roller according to the second exemplary embodiment.

In addition, as illustrated in FIG. 7, the flattening roller 100 is rotated in a direction Q by a rotary mechanism 202 which is disposed at the carriage CR (refer to FIG. 6) and which is controlled by the control section 240 (refer to FIG. 6).

In addition, the flattening roller 100 is moved and fixed to a predetermined height position by a lifting mechanism 208 which is disposed at the carriage CR (refer to FIG. 6) and which is controlled by the control section 240 (refer to FIG. 6).

The scraper 104 (refer to FIG. 3) and the collection mechanism 106 (refer to FIG. 3) which collects the modeling liquid removed by the scraper 104 are not provided.

Control Section

The control section 240 illustrated in FIG. 6 has a function of controlling each unit of the modeling apparatus 210. Specifically, in accordance with data received from an external device (not illustrated), the control section 240 converts data of the three-dimensional object VM included in the data into layer data for forming each layer LR in which the three-dimensional object VM is sliced with a determined thickness using a cross section perpendicular to the height direction. In accordance with the layer data, the control section 240 controls each unit configuring the modeling apparatus 210.

Hereinafter, the control for modeling the three-dimensional object VM will be described in detail. A function of the flattening roller 100 will not be described herein, but will be described later.

In a case where the control section 240 moves the carriage CR in the direction A (forward direction), the ejecting unit 222 controlled by the control section 240 ejects the droplet D toward the board BD, in accordance with the layer data.

The light-emitting unit 232 controlled by the control section 240 emits the emission light to the droplet D which is ejected and landed by the ejecting unit 222, thereby curing the droplet D.

As described above, the control section 240 controls each unit described above. While moving the carriage CR relative to the board BD in the direction A (forward direction), the control section 240 forms the layer LR obtained by curing the droplet D, and forms the three-dimensional object VM by overlapping the respective layers LR.

<Operation>

Next, modeling the three-dimensional object VM by using the modeling apparatus 210 according to the present exemplary embodiment will be described, and an operation in the present exemplary embodiment will be described.

First, if the control section 240 receives the data from the external device, the control section 240 converts the data of the three-dimensional object VM included in the above-described data into the layer data for forming each layer LR. In addition, the control section 240 controls the lifting mechanism 208 so as to move and fix the flattening roller 100 to a predetermined height position.

Next, the control section 240 causes the ejecting unit 222 to eject the droplet D while causing a driving source to move the carriage CR disposed at the home position in the direction A (forward direction).

Next, as the carriage CR moves in the direction A (forward direction), the control section 240 uses the light-emitting unit 232 so as to emit the emission light to the droplet D. As a result, the emission light is emitted to the droplet D, thereby curing the droplet D.

Figure 8:
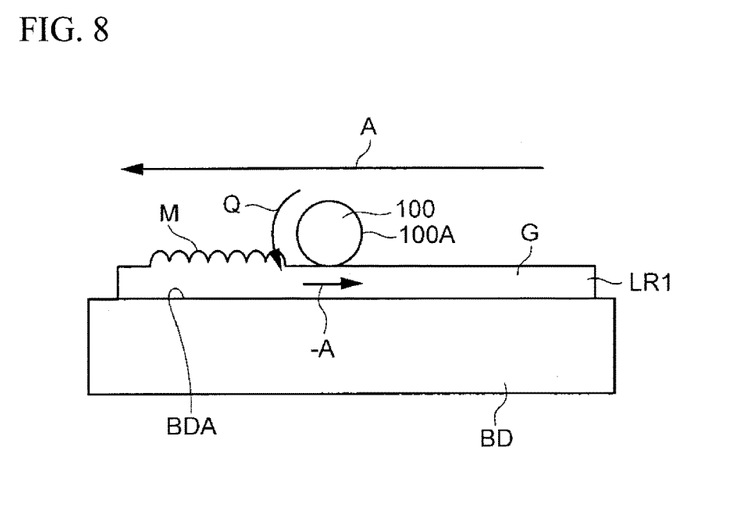
FIG. 8 is a view for describing a flattening operation performed by the flattening roller when moving in the direction A according to the second exemplary embodiment.

The light is emitted once to the cured modeling liquid G. Accordingly, the modeling liquid G is not completely cured, and is in a semi-cured state. The minute unevenness M2 appears on the surface of the semi-cured modeling liquid G. Then, the minute unevenness M2 on the surface of the modeling liquid G in a semi-cured state after the light is emitted is flattened by the flattening roller 100 which moves in the direction A (forward direction) while being rotated in the direction Q. Specifically, the flattening roller 100 is pressed against the unevenness M2 so as to uniformly flatten the minute unevenness M2.

The direction R in this case represents the rotation direction which is the same as the movement direction (direction −A) in which the modeling liquid G (board BD) moves relative to the flattening roller 100 (carriage CR), at a contact portion between the flattening roller 100 and the modeling liquid G. Accordingly, the modeling liquid G is more effectively flattened, compared to a case where the flattening roller 100 is rotated in the direction opposite to the movement direction in which the modeling liquid G (board BD) moves relative to the flattening roller 100.

Here, in a case where there are provided a plurality of flattening rollers 100 in the carriage CR, it is very difficult to control a height position of two flattening rollers 100 very accurately. As a result, if the two flattening rollers 100 are provided, there is a possibility that accuracy in performing the flattening operation may be degraded.

However, in the modeling apparatus 210 according to the present exemplary embodiment, only one flattening roller 100 is disposed at the carriage CR. Accordingly, it is not necessary to align the respective heights of the plurality of flattening rollers 100. Therefore, the accuracy is further improved in flattening the modeling liquid G, compared to a case where the plurality of flattening rollers 100 are disposed at the carriage CR.

[Others]

The present invention is not limited to the above-described embodiments.

For example, according to the above-described first exemplary embodiment, during the movement in the direction A (forward route), the flattening roller 100 flattens the modeling liquid G before the light is emitted. During the movement in the direction B (backward route), the flattening roller 100 flattens the modeling liquid G after the light is emitted. However, the flattening roller 100 may perform any one of flattening the modeling liquid G before the light is emitted, during the movement in the direction A (forward route) and flattening the modeling liquid G after the light is emitted, during the movement in the direction B (backward route). In this case, when the flattening roller 100 does not perform the flattening operation, the flattening roller is retreated to the upper side so as not to come into contact with the modeling liquid G.

In addition, according to the above-described first exemplary embodiment, the flattening roller 100 is rotated in the direction R, but the configuration is not limited thereto. The flattening roller 100 may be rotated in the direction opposite to the direction R.

In addition, according to the above-described first exemplary embodiment, the second light-emitting unit 34A, the first ejecting unit 22, the flattening roller 100, the first light-emitting unit 32, the second ejecting unit 24, and the second light-emitting unit 34B are arranged in parallel in this order, but the arrangement is not limited thereto.

The flattening roller 100 may be disposed between the second light-emitting unit 34A and the first ejecting unit 22. The flattening roller 100 in this case flattens the modeling liquid G before the light is emitted to the first droplet D1 ejected from the first ejecting unit 22 when the flattening roller 100 moves in the direction B.

Alternatively, the flattening roller 100 may be disposed between the first light-emitting unit 32 and the second ejecting unit 24. The flattening roller 100 in this case performs any one of flattening the modeling liquid G before the light is emitted to the first droplet D1 ejected from the first ejecting unit 22 during the movement in the direction A (forward route) and flattening the modeling liquid G after the light is emitted to the second droplet D2 ejected from the second ejecting unit 24 during the movement in the direction B (backward route).

Alternatively, the flattening roller 100 may be disposed between the second ejecting unit 24 and the second light-emitting unit 34B. The flattening roller 100 in this case flattens the modeling liquid G before the light is emitted to the second droplet D2 ejected from the second ejecting unit 24 during the movement in the direction A.

Alternatively, the flattening roller 100 may be disposed on any one outer side of the second light-emitting unit 34A and the second light-emitting unit 34B. The flattening roller 100 in this case flattens either the modeling liquid G after the light is emitted to the first droplet D1 ejected from the first ejecting unit 22 during the movement in the direction B or the modeling liquid G after the light is emitted to the second droplet D2 ejected from the second ejecting unit 24 during the movement in the direction A.

Alternatively, a configuration without the second ejecting unit 24 may be adopted. That is, one flattening roller 100 may be disposed at the carriage CR having the first ejecting unit 22, the first light-emitting unit 32, and the second light-emitting unit 34.

In short, according to the first exemplary embodiment, at least one flattening roller 100 for flattening the landed modeling liquid may be disposed at the moving unit having at least the ejecting unit, the first light-emitting unit 32 which emits the emission light so as to cure the modeling liquid discharged and landed while the ejecting unit moves in the forward direction, and the second light-emitting unit 34 which emits the emission light so as to cure the modeling liquid discharged and landed while the ejecting unit moves in the forward direction. Then, the flattening roller 100 may be configured to perform at least any one of flattening the modeling liquid before the light is emitted and flattening the modeling liquid after the light is emitted.

In addition, according to the above-described second embodiment, a configuration is adopted in which the ejecting unit 222, the light-emitting unit 232, and the flattening roller 100 are arranged in parallel in this order, but the arrangement is not limited thereto. A configuration may be adopted in which one flattening roller for flattening the modeling liquid after the emission light is emitted is disposed at the moving unit having one or a plurality of ejecting units and one or a plurality of light-emitting units.

In addition, according to the first exemplary embodiment and the second exemplary embodiment which are described above, the flattening roller 100 flattens the modeling liquid, but the configuration is not limited thereto. A flattening unit other than the flattening roller 100 may flatten the modeling liquid. For example, a blade may flatten the modeling liquid.

In addition, as a configuration of an image forming apparatus, it is possible to adopt various configurations without being limited to the configuration according to the above-described exemplary embodiments.

Furthermore, as a matter of course, various embodiments can be adopted within the scope not departing from the gist of the present invention.

What is claimed is:

1. A modeling apparatus comprising:
   a carriage configured to move reciprocally and relatively with respect to a board;
   at least one ejecting unit that is disposed at the carriage, wherein the ejecting unit is configured to eject a droplet of a photo-curable modeling liquid toward the board;
   a light-emitting device comprising:
      a first light emitter that is disposed at the carriage and that is configured to emit first light to the modeling liquid which is ejected and landed on the board, while the ejecting unit is moved in a forward direction, to cure the modeling liquid; and
      a second light emitter that is disposed at the carriage and that is configured to emit second light to the modeling liquid which is ejected and landed on the board, while the ejecting unit is moved in a backward direction, to cure the modeling liquid;
   a controller configured to control the carriage, the ejecting unit and the light-emitting device,
      wherein the controller is configured to model a three-dimensional object on the board by repeatedly ejecting droplets and emitting the first light and the second light so as to cure the droplets while causing the carriage to move reciprocally and relatively with respect to the board; and
   a flattener comprising a roller or a blade,
      wherein the flattener is disposed at one location in the carriage,
      wherein the flattener is configured to contact and flatten the landed modeling liquid, and
      wherein the modeling apparatus is configured such that, when moving in the forward direction, the flattener flattens the modeling liquid before the first light is emitted to the modeling liquid, and when moving in the backward direction, the flattener flattens the modeling liquid after the first light is emitted to the modeling liquid.

2. The modeling apparatus according to claim 1, wherein the flattener is configured to flatten the modeling liquid before the first light is emitted to the modeling liquid.

3. The modeling apparatus according to claim 2, wherein the flattener comprises the roller configured to rotate in a direction opposite to a movement direction in which the modeling liquid moves relative to the flattener at a contact portion with the modeling liquid when the modeling liquid is flattened.

4. The modeling apparatus according to claim 1, wherein the flattener is configured to flatten the modeling liquid after the first light is emitted to the modeling liquid.

5. The modeling apparatus according to claim 4, wherein the flattener comprises the roller configured to rotate in a same direction as a movement direction in which the modeling liquid moves relative to the flattener at a contact portion with the modeling liquid when the modeling liquid is flattened.

6. The modeling apparatus according to claim 1, wherein the flattener comprises the roller that is configured to be rotated in a direction opposite to a movement direction in which the modeling liquid moves relative to the flattener at a contact portion with the modeling liquid when the modeling liquid is flattened while the flattener is moved in the forward direction.

7. The modeling apparatus according to claim 1, wherein the flattener comprises the roller configured to, when moving in the forward direction, rotate in a direction opposite to a movement direction in which the modeling liquid moves relative to the flattener at a contact portion with the modeling liquid when the modeling liquid is flattened, and
   wherein the roller is configured to, when moving in the backward direction, rotate in a same direction as the movement direction in which the modeling liquid moves relative to the flattener at the contact portion with the modeling liquid when the modeling liquid is flattened.

8. The modeling apparatus according to claim 1, wherein the flattener comprises the roller,
   wherein the controller is configured to control the roller to, when the modeling liquid is in an uncured state, rotate in a direction opposite to a movement direction in which the modeling liquid moves relative to the flattener at a contact portion with the modeling liquid when the modeling liquid is flattened, and
   wherein the controller is configured to control the roller to, when the modeling liquid is in a semi-cured state, rotate in a same direction as the movement direction in which the modeling liquid moves relative to the flattener at the contact portion with the modeling liquid when the modeling liquid is flattened.

9. A modeling apparatus comprising:
a carriage configured to move relative to a board;
an ejecting unit that is disposed at the carriage,
- wherein the ejecting unit is configured to eject a droplet of a photo-curable modeling liquid toward the board;

a light-emitting device that is disposed at the carriage,
- wherein the light emitting device is configured to emit emission light to the modeling liquid which has been ejected and has landed on the board, while the light-emitting device is moved, to cure the modeling liquid;

a controller configured to control the carriage, the ejecting unit and the light-emitting device,
- wherein the controller is configured to model a three-dimensional object on the board by repeatedly ejecting droplets and emitting the emission light so as to cure the droplets while causing the carriage to move relative to the board; and a flattener comprising a roller or a blade,
wherein the flattener is disposed at one location in the carriage, and
wherein the modeling apparatus is configured such that, when moving in a forward direction the flattener flattens the modeling liquid before the emission light is emitted to the modeling liquid, and when moving in a backward direction, the flattener flattens the modeling liquid after the emission light is emitted to the modeling liquid.

* * * * *